United States Patent [19]

Horie

[11] Patent Number: 5,138,597
[45] Date of Patent: Aug. 11, 1992

[54] APPARATUS FOR DETECTING A READ ERROR OF AN OPTICAL RECORDING MEDIUM

[75] Inventor: Kiyoshi Horie, Yokohama, Japan
[73] Assignee: Kabushiki Kaisha CSK, Tokyo, Japan
[21] Appl. No.: 436,549
[22] Filed: Nov. 14, 1989
[51] Int. Cl.$^5$ .............................................. G11B 5/76
[52] U.S. Cl. ....................... 369/47; 369/59; 360/36.1
[58] Field of Search ............. 369/19, 47, 32, 53, 369/54, 59, 50, 48; 360/39, 51, 54, 32, 37.1, 36.1, 36.2; 358/319, 335, 337, 342

[56] References Cited

U.S. PATENT DOCUMENTS

| | | | |
|---|---|---|---|
| 4,672,597 | 6/1987 | Yamazaki | 369/59 |
| 4,682,318 | 7/1987 | Busby | 369/59 |
| 4,885,735 | 12/1989 | Fukushima et al. | 369/58 |

*Primary Examiner*—Roy N. Envall, Jr.
*Assistant Examiner*—Hung Dang
*Attorney, Agent, or Firm*—Lackenbach Siegel Marzullo & Aronson

[57] ABSTRACT

An apparatus for detecting a read error of an optical recording medium is provided with a reading device which reads data recorded on a data track of an optical recording medium to thereby store the read data in memory therein. This apparatus includes a PLL circuit responsive to a read clock from the optical recording medium for generating a clock synchronized with the read clock, and address updating circuit for updating a write address of the memory to store the read data therein in synchronization with the output clock from said PLL circuit. Also, included are out-of-locking detection circuit for detecting the out-of-locked state of the PLL circuit in response to the read clock and the output clock from the PLL circuit, and address-updating suppression circuit responsive to a detection signal from the out-of-locking detection circuit for suppressing the address updating of the address updating circuit. When the PLL circuit is detected to be in an out-of-locked state, no read data is stored into the memory so that only noraml data is acquired in the memory at any time.

2 Claims, 3 Drawing Sheets

APPARATUS FOR DETECTING A READ ERROR OF AN OPTICAL RECORDING MEDIUM

BACKGROUND OF THE INVENTION

1. Technical Field

The present invention relates to an apparatus for detecting a read error of an optical recording medium which includes a clock track, along with data track(s), having a predetermined pattern of clock bits recorded thereon.

2. Background Art

An optical recording medium has been attracting a good deal of public attention, which has a data recording surface having optical alteration patterns, such as light and dark pits, formed thereon to represent digital data. The optical recording medium realizes a large capacity of memory because of its high density data recording capability. This led us to a consideration of not only a disc type memory but also a card type memory.

In the card type memory or optical memory card, recording is done by forming optical (or magnetooptical) alternations in response to data to be recorded at discrete spots on the surface thereof, and then a light beam, such as a laser beam, is projected thereonto to read the alterations.

Specifically, fine unevenness or light and dark patterns terns are provided on a surface of a recording medium or card onto which a light beam is projected to recognize the recorded data according to the difference of reflectivity, refractive index, or transmissivity of the medium to the projected light beam. Alternatively, the recording medium may be photothermo-magnetically recorded and the recorded data may be read depending upon the change of polarization of the projected light due to the magnetooptical effect.

In juxtaposition with each of the data tracks of such an optical memory card there are provided a clock track for synchronization in a data write/read operation and a tracking guide line as a reference for causing the optical beam of an optical reading system to follow the track accurately.

The write/read timing of the optical recording medium is conventionally determined by a clock signal derived from a detector dedicated for detecting clock bits of the clock track.

Incidentally, if the clock is not accurately read in reading the clock track of the optical recording medium by reason of dust, scratch or the like on the optical recording medium or fluctuations of the moving velocity of the recording medium relative to the optical reading system, then it will be difficult to accurately achieve the write/read operation. An absence of the clock during a short term or relatively slow fluctuations of the velocity can be dealt with by using a phase locked loop (PLL) circuit which produces a clock of a frequency synchronized with the input of the read out or raw clock.

FIG. 5 illustrates a typical arrangement of a prior art PLL circuit. The PLL circuit 66 comprises a phase comparator 52, a low pass filter (LPF) 54, an amplifier 56, a voltage controlled oscillator (VCO) 58 and a 1/N frequency divider 53. This circuit compares, in phase, a received input signal with an output of the divider 53 so as to match the phase through controlling the VCO 58, thus producing, at the output thereof, a clock of a frequency of N times of that of the input signal.

However, for a long-term absence of the raw clock or for an abrupt change of the relative moving velocity of the medium the PLL circuit could not ensure the accurate data reading and may fall into an out-of-locked state.

DISCLOSURE OF INVENTION

An object of the present invention is, therefore, to provide an apparatus for detecting a read error of an optical recording medium which detects a disorder of a clock for a data reading operation so as to acquire normal data only.

In accordance with the present invention, as shown in FIG. 1, there is provided an apparatus for detecting a read error of an optical recording medium, provided with a reading device which reads data recorded on a data track of an optical recording medium 60 to thereby store the read data in memory means 68, the apparatus comprising:

a PLL circuit 66 responsive to a read clock from said optical recording medium 60 for generating a clock synchronized with the read clock;

address updating means 64 for updating a write address of said memory means to store said read data therein in synchronization with the output clock from said PLL circuit 66;

out-of-locking detection means 62 for detecting the out-of-locked state of said PLL circuit 66 in response to the read clock and the output clock from said PLL circuit 66; and address updating suppression means 63 responsive to a detection signal from said out-of-locking detection means 62 for suppressing the address updating of said address updating means 64.

The optical recording medium 60 may have a plurality of data tracks disposed thereon in parallel to each other and a plurality of memory means 68 may be provided, each of the memory means corresponding to the respective one of the plurality of data tracks and being commonly connected to the address updating means 64.

According to the present invention, data being read out of the optical recording medium is continued to be stored into the memory means as long as the locked state of the PLL circuit is maintained. Once an out-of-locking state of the PLL circuit is, however, detected it is assumed that the clock for data reading has fallen into disorder, and then the address updating for storing the read data is suppressed so as to acquire normal data only at any time.

Since restoration of normal clock input to the PLL circuit will cause the PLL circuit to resume its locked state again, it is not considered in the normal operation on the optical recording medium that the PLL circuit is kept in the out-of-locked state unusually for a long time. Therefore, it is preferable to provide means for automatically removing the suppression of the address updating after a lapse of time during which the PLL circuit is assumed to resume its locked state again after losing it. This means will enable the apparatus to continue to acquire the succeeding data.

DESCRIPTION OF THE PREFERRED EMBODIMENT

Now, one preferred embodiment of the present invention will be described in detail referring to the accompanying drawings.

Although the optical recording medium is assumed to be an optical memory card in this embodiment, it will be appreciated that the present invention may be applicable to other types of optical recording medium.

Figure 3:
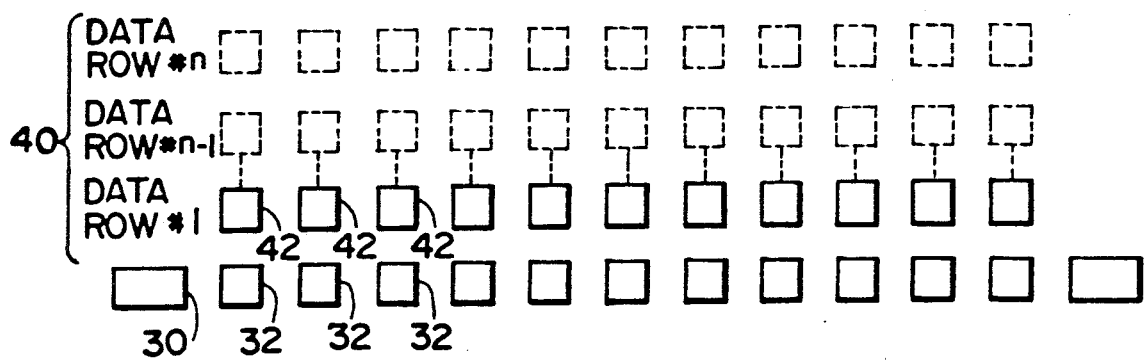
FIG. 3 illustrates an enlarged view of a portion of an optical recording medium having data tracks and a clock track disposed thereon, to witch the present invention may be applied.

The optical memory card to which the present invention is applied comprises, as shown in FIG. 3, a clock track 30 having a sequence of clock bits 32 disposed at regular intervals in a row and a data track section 40 provided in parallel to the clock track and including a plurality of data rows 1−n. The clock track 30 is also used as a tracking guide line. Alternatively, the guide line in this embodiment may be provided separately from the clock track.

Figure 2:
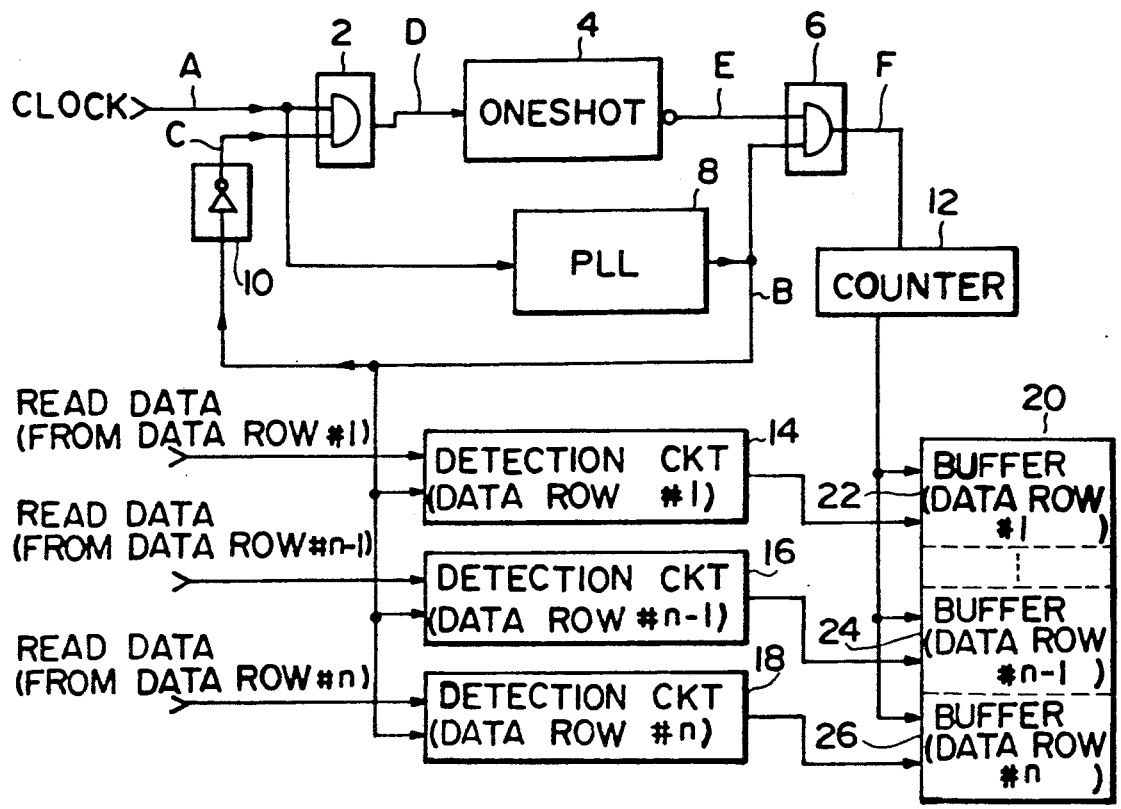
FIG. 2 shows a block diagram of one embodiment of the present invention.

Referring next to FIG. 2, there is shown a block diagram of one embodiment of the present invention.

Figure 1:
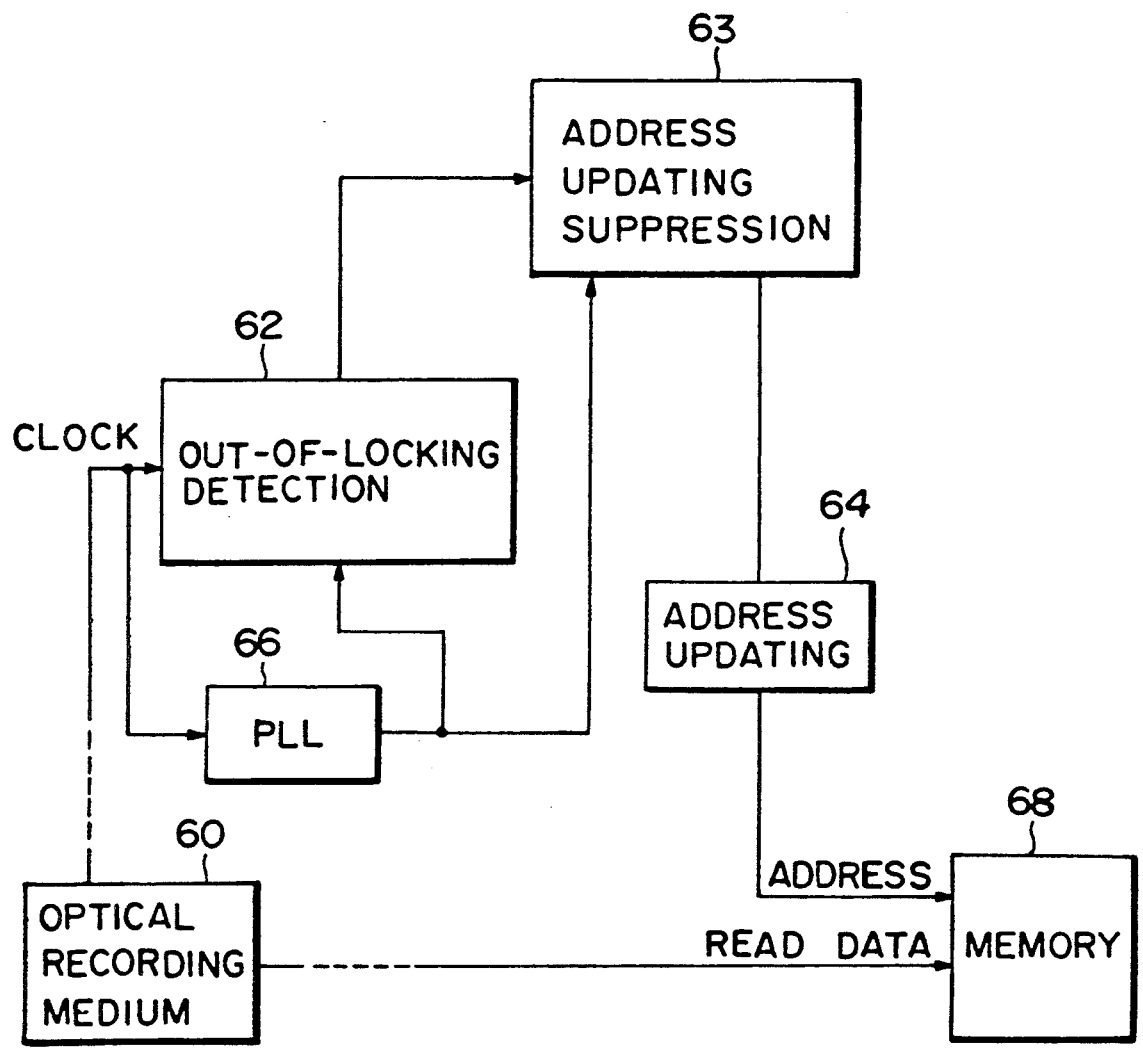
FIG. 1 shows a block diagram of an arrangement of the present invention.

In this invention the out-of-locking detection means 62 in FIG. 1 comprises an inverter 10, an AND circuit 2, and a one-shot circuit (monostable-multivibrator) 4. The one-shot circuit 4 also operates as means for cancelling the assertion of an address-updating suppression signal after a lapse of predetermined time after the assertion. The address updating means 64 and the address updating suppression means 63 in FIG. 1 comprise an AND circuit 6 and a counter 12, respectively. Also, the memory means 68 and the PLL circuit 66 in FIG. 1 comprise buffer memory 20 and a PLL circuit 8 (N=1), respectively.

The AND circuit 2 has one input for receiving a read clock A derived from the clock track on the optical recording medium and another input for receiving the inverted output signal C via the inverter 10 from the PLL circuit 8. In response to an output D of the AND circuit 6, the one-shot circuit 4 generates a negative-going pulse E of a predetermined duration at the rising edge of the output pulse of the signal D. The AND circuit 6 generates an output F as a count-up signal to the counter 12 in response to both an output E of the one-shot circuit 4 and an output B of the PLL circuit 8. The counter 12 provides its output data as an address for each buffer 22, 24, and 26 within the buffer memory 20. Data input to each of the buffer 22, 24 and 26 are of binarized version of the signals read out of the data rows 1−n on the optical recording medium 60 through data detection circuits 14, 16 and 18. The capacity of the buffer memory 20 may be determined depending on the application.

Figure 4:
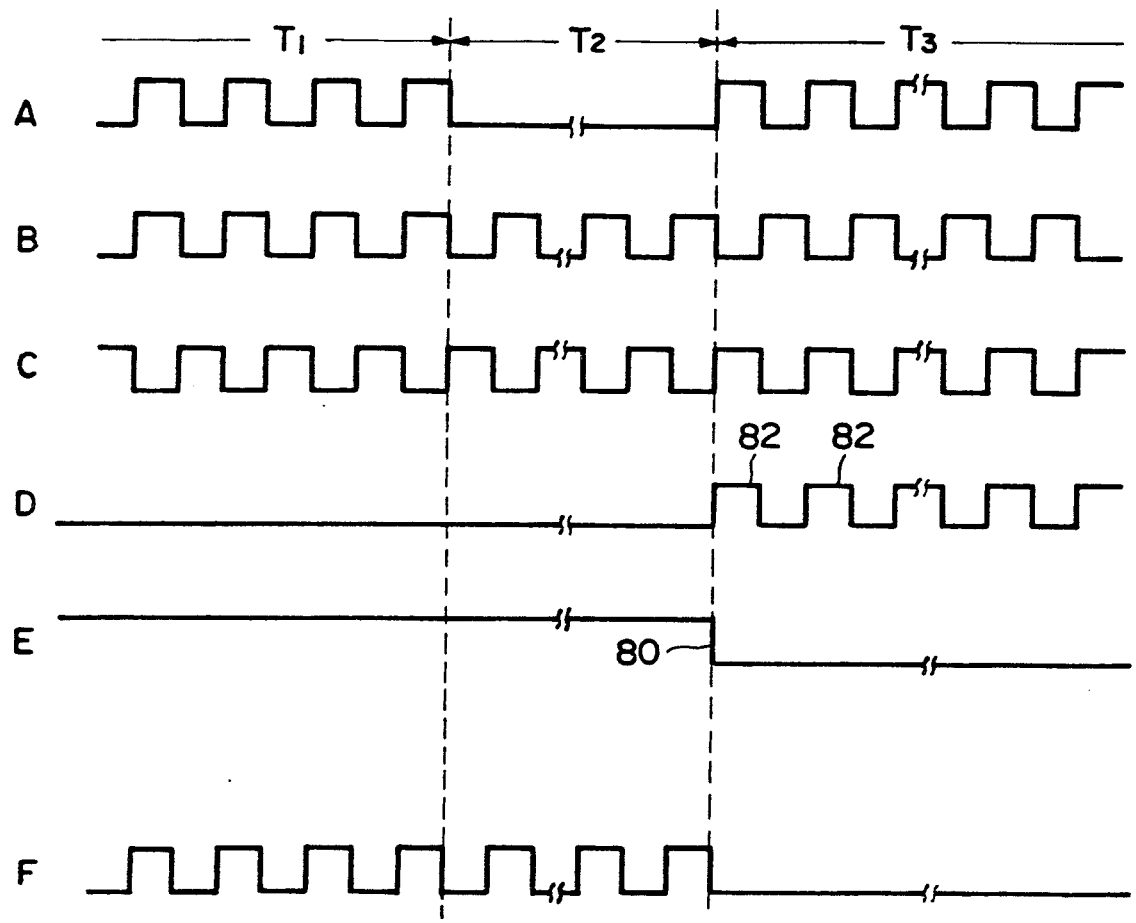
FIG. 4 is a timing diagram showing waveforms of the main signals in the circuit of FIG. 2.
Figure 5:
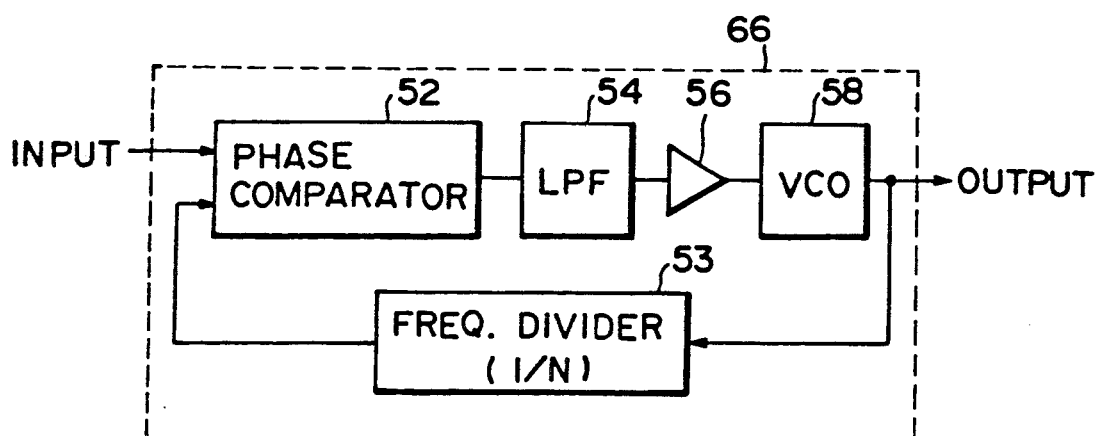
FIG. 5 shows a block diagram of the arrangement of a prior art PLL circuit.

Referring now to FIG. 2 and FIG. 4, the operation of the circuit shown in FIG. 2 is described hereinafter. FIG. 4 shows a timing diagram of the main signals of the FIG. 2 circuit.

The period $T_1$ indicates a normal operation period of the PLL circuit 8 which is being kept in its locked state. During this period, the read clock A and the output B of PLL circuit 8 are of the same frequency and matched in phase, that is, the clock A and the inverted signal C are 180 degree shifted in phase from each other. As a result, the AND circuit 2 generates no pulse at its output, maintaining the output E of one-shot 4 at a high state. The high level output of the one-shot 4 causes the AND circuit to pass therethrough the output B of the PLL circuit 8 as a signal F which in turn drives the counter 12 to count it up. Thus, the address of the buffer 20 is updated to sequentially store in the updated address the read data from the optical recording medium.

Now assuming that it is impossible to read the clock bits at the end of the period $T_1$ and the PLL circuit 8 has fallen into the out-of-locked state after the lapse of the period $T_2$, then in the following period $T_3$ the signal A will not match in phase with the signal B, thereby producing pulses 82 in the output D of the AND circuit 2.

At the rising edge of the first pulse of the pulses 82, the one-shot 4 is driven to generate a negative-going pulse of a predetermined duration in its output E (the trailing edge thereof is not shown in FIG. 4). The low level of the signal E causes the AND circuit 6 to prevent the output B from passing therethrough, thus suppressing the address updating on the counter 12. Simultaneously, data writing to the buffer 20 is also suppressed (not shown).

After the lapse of the output period of the negative-going pulse 80 on the output E, the signal E will go back to its high state, allowing the signal B to pass through the AND circuit 6. At this time, the PLL circuit 8 is considered to have already been restored to its locked state.

Although one preferred embodiment has been described, it will be readily appreciated that many changes and modifications can be made without departing from the scope or spirit of the invention. For example, while a plurality of the data tracks are read at the same time in the above-described embodiment, only one data track may be read at any time.

I claim:

1. An apparatus for detecting a read error of an optical recording medium provided with a reading device which reads data recorded on a data track of an optical recording medium to thereby store the read data in memory means therein, the apparatus comprising:
  a PLL circuit responsive to a read clock from said optical recording medium for generating a clock synchronized with the read clock;
  address updating means for updating a write address of said memory means to store said read data therein in synchronization with the output clock from said PLL circuit;
  out-of-locking detection means for detecting the out-of-locked state of said PLL circuit in response to the read clock and the output clock from said PLL circuit; and
  address updating suppression means for suppressing the address updating of said address updating means when the out-of-locking of said PLL circuit is detected and for transmitting an output of said PLL circuit for enabling said address updating means when the out-of-locking of said PLL is not detected.

2. The apparatus for detecting an read error of an optical recording medium in accordance with claim 1 wherein said optical recording medium has a plurality of data tracks disposed thereon in parallel to each other and wherein a plurality of memory means are provided, each of said memory means corresponding to the respective one of said plurality of data tracks and being commonly connected to said address updating means.

* * * * *